United States Patent

[11] 3,608,580

| [72] | Inventors | Conrad J. Hohmann<br>Grosse Pointe Woods;<br>Clarence W. Smith, Farmington; Ronald J. Klatt, Redford, all of Mich. |
|---|---|---|
| [21] | Appl. No. | 886,257 |
| [22] | Filed | Dec. 18, 1969 |
| [45] | Patented | Sept. 28, 1971 |
| [73] | Assignee | Kelsey-Hayes Company |

[54] PILOT-OPERATED RELIEF VALVE
7 Claims, 1 Drawing Fig.

[52] U.S. Cl. ................................................. 137/490
[51] Int. Cl. .................................................. F16k 17/10
[50] Field of Search ...................................... 137/490, 489, 488; 251/28, 38, 44

[56] References Cited
UNITED STATES PATENTS

| 534,514 | 2/1895 | Mellin | 137/490 |
| 3,033,228 | 5/1962 | Mohler | 137/490 |
| 3,208,473 | 9/1965 | Budzich et al. | 137/490 |
| 3,375,844 | 4/1968 | Mercier et al. | 137/490 X |

FOREIGN PATENTS

| 1,251,906 | 4/1959 | France | 137/490 |
| 21,143 | 1895 | Great Britain | 251/44 |

*Primary Examiner*—M. Cary Nelson
*Assistant Examiner*—Richard Rothman
*Attorney*—Harness, Dickey & Pierce ABSTRACT: A pilot-operated relief valve having simplified construction and wherein a main valve member controls the flow through a fluid passage interconnecting first and second chambers. A third chamber is provided that is in communication with the first chamber by means of second fluid passage formed in the valve housing. The main valve member has areas exposed to the pressure in the first and third fluid chambers and is normally biased to a closed position when the pressure in these chambers is equal. A third passage is formed through the main valve member and interconnects the third fluid chamber with the first fluid chamber. A pilot valve member is supported within the main valve member and controls the flow through this third fluid passage. The pilot valve member is normally biased to a closed position and when the pressure in the third fluid chamber exceeds a predetermined value, the pilot valve member will open. The opening of the pilot valve member reduces the pressure in the third fluid chamber and the pressure in the first fluid chamber acting on the main valve member then forces it to an open position whereby flow from the first chamber to the second chamber through the first passage is permitted.

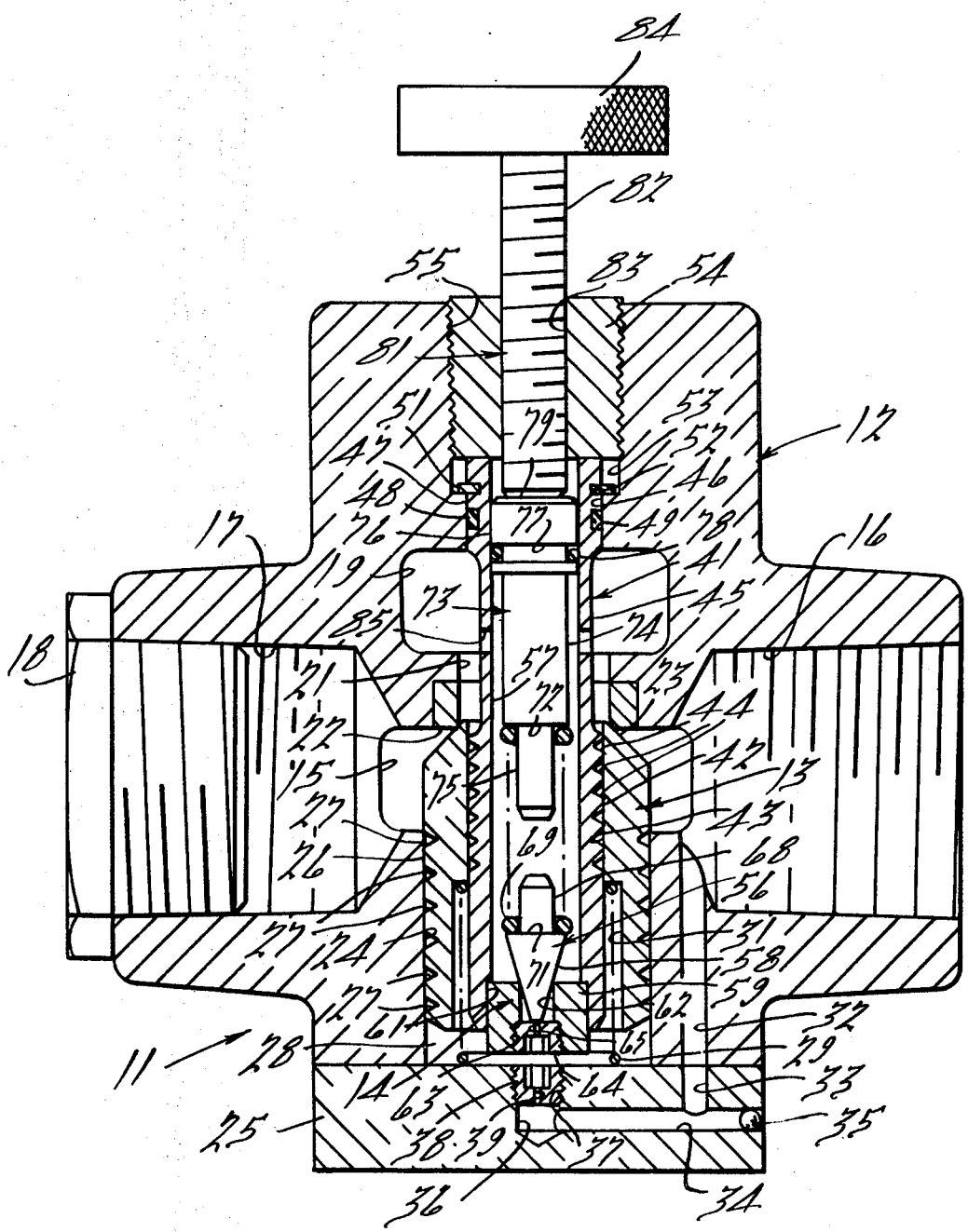

3,608,580

PILOT-OPERATED RELIEF VALVE

BACKGROUND OF THE INVENTION

This invention relates to an improved pilot-operated relief valve.

Relief valves and their function are quite well known. Normally, such a valve includes a movable valve member and biasing spring that holds the valve member in a closed position until a predetermined pressure is exceeded. Frequently, particularly when dealing with high pressures, the biasing springs in such valves get extremely large. The use of such heavy springs is undesirable for many reasons, which are well known. For this reason, it has been proposed to provide a pilot-operated relief valve in which a smaller valve member is responsive to the pressure to be relieved and which offsets a pressure balance on the main valve member causing it to open. Many valves of this type have been proposed. Obviously, the use of the additional valve member and the requisite additional fluid passages complicates the valve structure and may increase its cost.

It is, therefore, a principal object of this invention to provide an improved, simplified pilot-operated relief valve.

It is another object to provide a pilot-operated relief valve that may be made at a relatively low cost and may be conveniently assembled.

It is yet another object of the invention to provide a pilot-operated relief valve in which all of the valve components are mounted in a single housing.

It is a further object of this invention to provide a pilot-operated relief valve that offers a simple external adjustment.

SUMMARY OF THE INVENTION

This invention is particularly adapted to be embodied in a pilot-operated pressure responsive valve. Such a valve comprises a valve housing defining first, second and third fluid chambers, a first fluid passage connecting the first fluid chamber and the second fluid chamber, and a second passage interconnecting said first fluid chamber with said third fluid chamber. A main valve member controls the flow through the first passage from the first fluid chamber to the second fluid chamber. The main valve member has a first area exposed to the pressure in the first fluid chamber and a second area exposed to the pressure in the third chamber. The main valve member is normally biased to a first position when the pressures in the second and third chambers are in a predetermined relationship. A third passage is formed through the valve member extending between the third fluid chamber and the second fluid chamber and a pilot valve is supported within the main valve member for controlling the flow through this third passage. The pilot valve is normally biased toward a closed position for precluding flow from the third chamber to the second chamber and for maintaining a predetermined pressure in the third chamber so that the main valve member remains in its first position. The pilot valve is adapted to open when the pressure in the third chamber exceeds the predetermined pressure for altering the pressure relationship between the first and third chambers whereby the pressure acting on the first area of the main valve member in the first chamber causes the main valve member to move from its first position to a second position.

BRIEF DESCRIPTION OF THE DRAWINGS

The sole FIGURE is a cross-sectional view of a pilot-operated relief valve embodying this invention.

DETAILED DESCRIPTION OF THE PREFERRED EMBODIMENT

The reference numeral 11 indicates generally a pilot-operated relief valve embodying this invention. The relief valve 11 is comprised generally of a valve housing assembly 12, a main valve member 13 and a pilot valve assembly 14.

The valve housing assembly 12 is comprised of a main member in which a first fluid chamber 15 is formed. The first fluid chamber 15 is intersected by a pair of alternative inlet ports 16 and 17 either of which may be used to communicate high pressure to the valve chamber 15. In the depicted embodiment, the chamber 15 is pressurized through the the port 16 and the port 17 is closed by means of a closure plug 18.

A second fluid chamber 19 is juxtaposed to the first chamber 15 and is connected by means of any suitable passage (not shown) formed in the valve housing assembly 12 to a relief line. A passage 21 is formed in the valve housing assembly 12 and extends between the chambers 15 and 19. A valve seat 22 is positioned at one end of the passage 21 and is normally engaged by a conical surface 23 of the main valve member 13 for precluding flow from the first chamber 15 to the second chamber 19.

A cylindrical bore 24 is formed in the valve housing assembly 12 coaxially with the passage 21 and intersecting the chamber 15. The outer end of the bore 24 is closed by a closure member 25 that forms a portion of the valve housing assembly 12. The main valve member 13 is formed with a generally cylindrical portion 26 that is slidably received in the bore 24. The surface of the cylindrical portion 26 is formed with a plurality of circumferential grooves 27, the size of which is exaggerated in the drawings, for the sake of illustration. The cylindrical portion 26 has a close fit with the bore 24 and thus establishes an effective seal in this area. The grooves 27 in the surface 26 assist in the sealing function since they will permit any fluid which leaks into this area to flow around the portion 26 and center the portion 26 within the bore 24. Thus, a relatively fluid tight seal is provided between the chamber 15 and a third fluid chamber 28 that is formed by the bore 24 at the lower end of the main valve member 13. A coil compression spring 29 bears against the closure member 25 and is received in a counterbore 31 formed in the main valve member 13 for urging the main valve member portion 23 into engagement with the valve seat 22.

The chamber 28 is in a fluid communication with the chamber 15. This fluid communication is accomplished by means of a second fluid passage that is comprised of a drilled passage 32 that extends from the lower face of the main valve housing member upwardly and intersects the port 16. A corresponding passage 33 is drilled in the closure member 25 and the passage 33 intersects a generally radially extending passage 34 that is drilled into the closure member 25 from its outer surface. The drilled passage 34 is closed at its outer end by means of a closure plug 35. A larger drilled passage 36 extends form the chamber 28 through the upper face of the closure member 25 and intersects the passage 34. The end of the drilled passage 36 adjacent the chamber 28 is threaded, as at 37, to receive a plug 38 in which a restricted orifice 39 is formed.

A supporting member, indicated generally by the reference numeral 41, extends through the central portion of the valve housing assembly 12. The supporting member 41 has a generally cylindrical lower portion 42 around which the spring 29 extends. In addition, a cylindrical bore 43 of the main valve member 13 slidably supports this main valve member on the supporting member 41. The surface 42 is formed with a plurality of circumferential grooves 44, the size of which is exaggerated in the figure, which coact to assist the seal formed between the mated surfaces of the valve member 13 and supporting member 41 through permitting centralization of the valve member 13 in the same manner as described in connection with the grooves 27.

Adjacent the cylindrical portion 42, the supporting member 41 is formed with a reduced diameter cylindrical portion 45 that extends through the passage 21 and chamber 19 and which terminates adjacent a bore 46 formed in the main portion of the valve housing assembly 12. The diameter of the supporting member 41 increases at the bore 46, as at 47, to snugly engage the valve housing assembly 12 at the bore 46. A seal 48 is received in a groove 49 in the supporting member 41 to form a fluidtight seal in this area. A snapring 51 is also received in a circumferential groove 52 in the supporting member 41 and abuttingly engages the base of a counterbore 53 formed in the valve housing assembly 12. A closure plug 54 is threaded into a female threaded opening 55 formed at the upper end of the counterbore 53 and abuttingly engages the upper end of the supporting member 41 for axially fixing the supporting member 41 within the valve housing assembly 12.

The pilot valve assembly 14 is comprised of a pilot valve member, indicated generally by the reference numeral 56, that is supported within a cylindrical bore 57 that extends coaxially through the supporting member 41. The pilot valve member 56 has a conical portion 58 that is adapted to seat against a valve seat 59 that is press fitted or otherwise secured into a counterbore 61 formed at the base of the supporting member bore 57. The valve seat 59 is formed with a bore 62 with which the conical surface 58 of the pilot valve member 56 cooperates. At the lower end of the bore 62, the valve seat 59 is formed with a tapped opening 63 in which a plug 64 is received. The plug 64 is formed with an orifice 65 that controls the flow from the third chamber 28 into the bores 62 and 57, as will become more apparent as this description proceeds.

The pilot valve member 58 is formed with a reduced-diameter cylindrical portion 68 that is encircled by a coil compression spring 69. One end of the spring 69 bears against a shoulder 71 formed at the base of the cylindrical portion 68 and the other end of this spring bears against a shoulder 72 formed on a preloading member, indicated generally by the reference numeral 73, between cylindrical sections 74 and 75. At the upper end of the section 74, the preloading member 73 is formed with a larger diameter cylindrical section 76 that is slidably received in the supporting member bore 57. The section 76 is provided with a circumferential groove 77 in which an O-ring seal 78 is positioned. The O-ring seal 78 forms a fluidtight seal between the preloading member 73 and the supporting member 41. At the upper end of the section 76, the preloading member 73 is formed with a flattened surface 79 against which bears an adjusting screw, indicated generally by the reference numeral 81. The adjusting screw 81 has a threaded portion 82 that is received in a complementary threaded opening 83 formed in the closure plug 54. The upper end of the adjusting screw 81 is formed with an enlarged knurled knob portion 84 that may be rotated so as to move the preloading member 73 axially and change the preload on the spring 69 and, accordingly, the pressure at which the pilot valve member 56 opens.

OPERATION

The valve assembly 11 is shown in the drawing in its closed position. It is also assumed that the spring 69 has been preloaded so that the pilot valve member 56 will open at the desired pressure. Inlet pressure is transmitted to the cavity 15 through the inlet passage 16 and to the third cavity 28 through the passages 32, 33 34, 36 and orifice 39. Hence, substantially equal pressures will be present in the chambers 15 and 28. The main valve member 13 has areas disposed to the pressure in each of these chambers so that the pressure acting upon the main valve member 13 in each chamber will tend to cause an axial movement of the valve member in the bore 24. The spring 29 has sufficient preload to hold the conical portion 23 of the main valve member 13 against the valve seat 22 when the pressures in the chambers 15 and 28 are substantially equal. Assuming that these pressures, and particularly the pressure in the chamber 28, is less than the pressure to be relieved, the pilot valve member 56 will be held against the valve seat 59 by the spring 69. Thus, there will be no flow permitted through the orifice 65.

If the pressure in the inlet conduit 16 rises above the pressure to be relieved, this increase in pressure will be transmitted to the chamber 28 through the passages previously mentioned. The pressure acting on the head of the pilot valve member 56 will then urge it away from the valve seat 59 and open the bore 57 to the chamber 28 through the orifice 65. The fluid in the chamber 28 may then flow through the orifice 65 and bore 62 into the bore 57. This fluid will pass through the clearances that exist between the bore 57 and the pilot valve member 56 and the reduced-diameter portion 74 of the preloading member 73. This fluid is discharged from the bore 57 into the cavity 19 through a plurality of radially extending ports 85 formed in the supporting member 41 adjacent this chamber. The fluid flowing into the chamber 19 through the pilot valve member 14 may be returned to any low-pressure area such as a sump (not shown) through the discharge passage which has been previously noted, but which does not appear in the drawing.

When the chamber 28 is vented to the sump or to the area of reduced pressure through the opening of the pilot valve member 56, the chamber 28 will be at a lower pressure than the chamber 15. The establishment of this pressure differential is further assisted by the orifice 39 that resists the flow between the chambers 15 and 28. The orifice 65 also provides some flow restriction and the orifices 39 and 65 coact to reduce hunting or rapid cycling of the valve assembly.

When the chamber is at a higher pressure than the chamber 28, the main valve member 13 will be forced downwardly against the action of the spring 29 and accomplish a direct opening of the chamber 15 to the chamber 19 through the passage 21. Hence, the pressure rise in the chamber 15 will be relieved and when the desired pressure is again reached, the valve assembly 11 will close.

It should be readily apparent that the disclosed valve assembly, in addition to having all of the advantages of a conventional pilot operated valves, is relatively simple in construction in that the number of passages required are reduced over conventional arrangements. In addition, the main passages in the valve housing assembly 12 are all coaxially disposed. This simplifies machining and makes alignment easier.

What is claimed is:

1. A pressure-responsive valve comprising a valve housing defining first, second and third fluid chambers, a first passage connecting said first fluid chamber with said second fluid chamber, and a second passage interconnecting said first fluid chamber with said third fluid chamber, a supporting member carried by said housing and extending into at least one of said chambers, a main valve member slidably supported on said supporting member for controlling the flow through said first passage from said first fluid chamber to said second fluid chamber, said main valve member having a first area exposed to the pressure in said first fluid chamber and a second area exposed to the pressure in said third fluid chamber, said main valve member being normally biased to a first position when the pressure in said first and said third fluid chambers are in a predetermined relationship, a third passage formed in said supporting member extending from said third fluid chamber to said second fluid chamber, and a pilot valve supported within said supporting member for controlling the flow through said third passage, said pilot valve being biased toward a closed position for precluding flow from said third chamber and for maintaining a predetermined pressure in said third chamber, said pilot valve being adapted to open when the pressure in said third chamber exceeds the predetermined pressure for establishing a pressure differential between said first fluid chamber and said third fluid chamber and for moving said main valve member from its first position to a second position.

2. A pressure-responsive valve as set forth in claim 1 further including means for adjusting the preload on the pilot valve for altering the pressure in the third fluid chamber at which said pilot valve opens, said adjusting means including means accessible externally of said valve.

3. A pressure-responsive valve as set forth in claim 1 wherein the first position of the main valve member is a closed position wherein flow through the first passage is precluded, the second position of said main valve member being an opened position wherein flow through said first passage is permitted.

4. A pressure-responsive valve as set forth in claim 3 further including an orifice in the second passage and in the third passage for reducing hunting of said valve.

5. A pressure-responsive valve as set forth in claim 1 wherein the first passage and the third fluid chamber are formed by coaxial first and second bores in the valve housing, the main valve member having a cylindrical portion slidably supported in the second bore and forming with the valve housing and the supporting member the third fluid chamber.

6. A pressure-responsive valve as set forth in claim 5 wherein the supporting member is coaxially disposed in the first and second bores.

7. A pressure-responsive valve as set forth in claim 6 further including spring means contained within said supporting member and engaging said pilot valve, said spring means further engaging a preloading member slidably supported in said supporting member, and externally accessible means for moving said preloading member within said supporting member for changing the preload on said spring means.